(No Model.)

E. S. LAUGHINGHOUSE.
FEED MECHANISM FOR SAW MILLS.

No. 284,443. Patented Sept. 4, 1883.

WITNESSES:
Thos. Houghton.
A. G. Lyne.

INVENTOR:
E. S. Laughinghouse
BY Munn
ATTORNEYS.

UNITED STATES PATENT OFFICE.

EDWARD S. LAUGHINGHOUSE, OF KINSTON, NORTH CAROLINA.

FEED MECHANISM FOR SAW-MILLS.

SPECIFICATION forming part of Letters Patent No. 284,443, dated September 4, 1883.

Application filed May 26, 1883. (No model.)

*To all whom it may concern:*

Be it known that I, EDWARD S. LAUGHINGHOUSE, of Kinston, in the county of Lenoir and State of North Carolina, have invented a new and useful Improvement in Feed-Motions for Saw-Mills, of which the following is a full, clear, and exact description, reference being had to the annexed drawings, forming part of this specification.

This invention relates to a feed-motion in which a shifting friction-gear is combined with the saw-arbor for securing a reversible rotary motion for operating the carriage.

Figure 1:
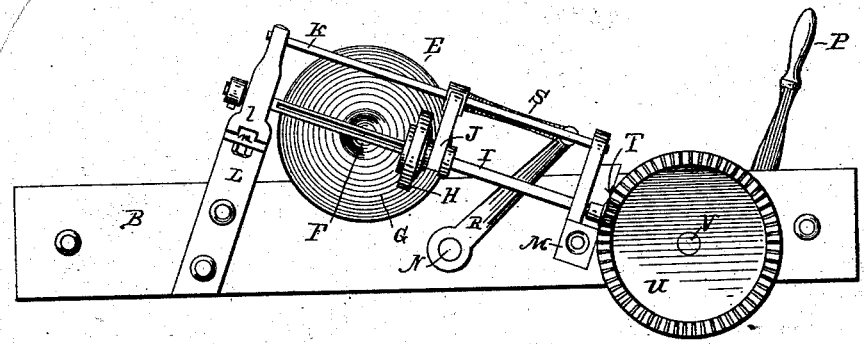
Figure 2:
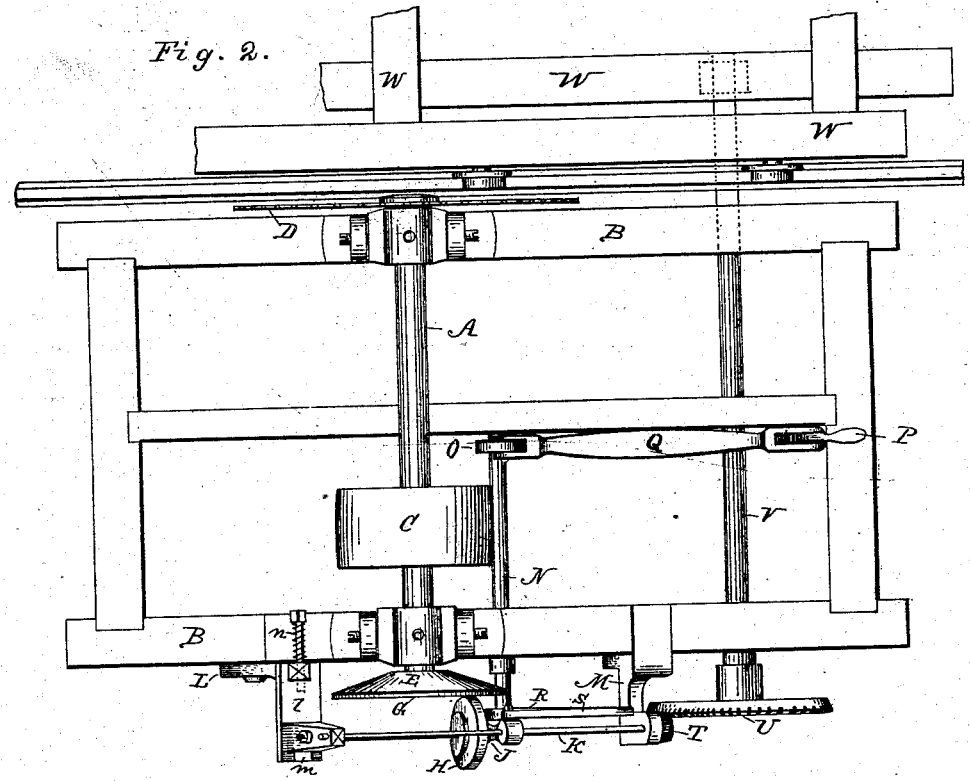

In the drawings, Figure 1 is a side elevation of part of a saw-mill, showing my invention; and Fig. 2 is a plan view of the same.

A indicates the saw-arbor, supported on the frame B, and provided with the band-pulley C, for receiving motion to drive the saw D. The arbor A, at its end opposite to the saw, is provided with a driving friction wheel or plate, E, having a concave recess, F, at the center, and a frictional surface formed by minute concentric grooves G. A shifting friction-gear, H, is feathered on a shaft, I, and arranged with its periphery in contact with the frictional surface of the wheel E, and is connected to a clutch-fork, J, which is adapted to slide on a rod, K, supported by the brackets L M, in which the shaft I is journaled.

In the lower part of the frame B is journaled a rock-shaft, N, having a short arm, O, connected to a lever, P, by a connecting-bar, Q, and a long arm, R, connected to the clutch-fork J by the bar S. With this construction a slight movement of the lever P will suffice to shift the gear H diametrically across the face of the wheel E, and as it crosses the center the direction of its rotation will be reversed. When the gear H is adjusted at the center of the wheel E, the concave recess F will prevent the wheel from acting on the gear, and the latter and its shaft I will become motionless. The shaft I is provided with a bevel-pinion, T, which meshes with a large bevel-gear wheel, U, secured to the shaft V, which is adapted to engage with and communicate motion to the carriage W by the means usually employed for that purpose.

The bracket L is formed in two parts, *l m*, adapted to slide one on the other, and connected by a guide-pin and spiral spring, *n*, for securing a constant degree of friction between the wheel E and gear H.

With the above construction the carriage W may be moved forward and then back by simply adjusting the lever P in the manner above indicated, and the speed of the carriage can be varied, as required, by moving the gear H nearer to or farther from the center of the wheel E.

What I claim is—

1. In a saw-mill, the combination, with the saw-arbor having a friction-wheel secured thereon, of the shifting friction-gear arranged in contact with said wheel, the shaft supporting said gear and provided with a pinion, the carriage driving-shaft having a wheel meshing with said pinion, and means for shifting the said gear diametrically across the said friction-wheel, substantially as shown and described.

2. In a saw-mill, the combination, with the saw-arbor having the friction-wheel E, formed with a concave recess, F, at the center, of the shaft I, supported in suitable brackets at the side of said wheel, the friction-gear H, feathered on said shaft, and means for shifting the gear H to the center of said wheel E, substantially as and for the purpose specified.

3. In a saw-mill, the combination, with the saw-arbor having the friction-wheel E, formed with minute frictional grooves G, of the shaft I, the friction-gear H, adapted to slide thereon, the clutch-fork J, the guide-rod K, the rock-shaft N, connected by a long arm to the clutch-fork, and the lever P, connected by a short arm to the rock-shaft, substantially as shown and described.

4. In a saw-mill, the combination, with the saw-arbor having the friction-wheel E, of the shaft I, the friction-gear H and means for shifting said gear, and the bracket L, supporting one end of shaft I, and having a spring-tensioned part, *l*, for securing a constant degree of friction between the wheel E and gear H, substantially as shown and described.

EDWARD S. LAUGHINGHOUSE.

Witnesses:
A. G. LYNE,
SOLON C. KEMON.